(12) United States Patent
Kobayashi (10) Patent No.: US 7,142,128 B2
(45) Date of Patent: Nov. 28, 2006

(54) PORTABLE INFORMATION DEVICE, ACCESS DEVICE FOR PORTABLE INFORMATION DEVICE, HOME NETWORK SYSTEM, AND HOME NETWORK ACCESS METHOD

(75) Inventor: Shinji Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 470 days.

(21) Appl. No.: 09/955,236

(22) Filed: Sep. 17, 2001

(65) Prior Publication Data

US 2002/0033760 A1 Mar. 21, 2002

(30) Foreign Application Priority Data

Sep. 18, 2000 (JP) ............................ P2000-281593

(51) Int. Cl.
*H04Q 1/00* (2006.01)
(52) U.S. Cl. ............. 340/825.52; 370/402; 340/825.22
(58) Field of Classification Search ........... 340/825.52, 340/825.56, 825.22, 825.24, 825.25, 825.69, 340/825.72, 3.5; 370/402, 466, 467; 710/305; 709/220, 221, 222, 225, 245, 238, 249, 250; 455/556.1, 556.2, 557
See application file for complete search history.

(56) References Cited

U.S. PATENT DOCUMENTS 4,746,919 A * 5/1988 Reitmeier .............. 340/825.56

| | | | | |
|---|---|---|---|---|
| 5,452,291 A | * | 9/1995 | Eisenhandler et al. ...... | 370/402 |
| 5,898,386 A | * | 4/1999 | Kaihatsu ................ | 340/825.69 |
| 5,909,183 A | * | 6/1999 | Borgstahl et al. ....... | 340/825.22 |
| 5,959,539 A | * | 9/1999 | Adolph et al. ............... | 340/3.5 |
| 6,133,847 A | * | 10/2000 | Yang ..................... | 340/825.22 |
| 6,198,479 B1 | * | 3/2001 | Humpleman et al. ....... | 715/733 |
| 6,199,136 B1 | * | 3/2001 | Shteyn ...................... | 710/305 |

OTHER PUBLICATIONS

Saito et al, "Gateway Technologies for Home Network and Their Implementations," IEEE CNF- Distributed Computing Systems Workshop, 2001 International Conference on , Apr. 16-19, 2001, pp. 175-180.*

\* cited by examiner

*Primary Examiner*—Edwin C. Holloway, III
(74) *Attorney, Agent, or Firm*—Finnegan, Henderson, Farabow, Garrett & Dunner, L.L.P.

(57) ABSTRACT

A home network system disclosed herein includes a high-speed network for networking a plurality of home appliances and a low-speed network. A portable information device is provided so as to be connectable to the high-speed network and the low-speed network 11 in a wireless manner. A portable information device access point is provided for helping the portable information device reciprocally communicate with the home appliances connected to the high-speed and low-speed networks. The portable information device does negotiation with the access point to be served by the access point. Thus, both the home appliances and the portable information device share their resources to effectively exploit them, with the home appliances organically associated with the portable information device such as a cellular phone or a PDA.

5 Claims, 6 Drawing Sheets

PORTABLE INFORMATION DEVICE, ACCESS DEVICE FOR PORTABLE INFORMATION DEVICE, HOME NETWORK SYSTEM, AND HOME NETWORK ACCESS METHOD

BACKGROUND OF THE INVENTION

1. Field of the Invention

The present invention relates generally to a portable information device associated with a home network. More particularly, the present invention relates to a portable information device contributing to the mutual use of the resources of the portable information device and the home appliances connected to a home network.

2. Description of the Related Art

A network connecting to home conventionally meant ground-based TV broadcastings and phone lines over ten years ago. Also, a home network had meant nothing but connection between the TV and VTR or between audio devices because personal computers (PCs) and digital products including a CD player had not been spread home then.

However, the home network has rapidly come to be in the spotlight recently, exploiting the Intranet technology, which has been developed for business use, such as LAN.

The rapid popularization of information devices such as a PC, a printer, and a scanner and the sharp increase of the number of Internet users as well as the diversification of communication and broadcasting services contribute to the progress of the home network. Besides general phone lines, various kinds of communication means such as ISDN line, cellular phone, and PHS have been developed. To add to the ground-based broadcasting, other broadcasting services such as BS and CS analogue broadcastings, CATV, and digital CS broadcasting are being launched. In the audiovisual (AV) industries, digital products such as a MD player, a digital video camera, and a digital still camera have rapidly progressed, expecting that digital videos and digital TVs will further develop. Also, the technology has been introduced that allows home appliances such as a refrigerator, an air conditioner and a microwave oven to be connected to a home network and allows these connected appliances to be remotely operated and maintained.

In the industry of communication devices, it is no wonder any more that cordless phones are used, and mobile communication devices such as a cellular phone and a PHS have remarkably progressed. Personal digital assistants (PDAs) used as personal information management tool also increases in the number of users. A hand-held terminal containing a communication device such as a cellular phone or a PHS appears to serve as e-mail or personal information manager (PIM).

Thus, the portable information devices such as a cellular phone and PDAs have remarkably progressed as well as the home network. The use of portable information devices is however limited to out-of-home uses such as phone calling, data communication, and schedule management, and is isolated from home appliances. Resources and units on a portable information device, such as operation and display units, therefore are not usable for the home network.

Portable information devices such as a cellular phone and PDAs are independently operated on themselves, not intended to be operated by external equipment. If the potable information devices, which are progressing in personalization, share resources of external equipment, they can be exploited effectively.

SUMMARY OF THE INVENTION

The present invention has been achieved to obviate these and other shortcomings of the related art. It is therefore an object of the present invention to enable house use of resources, operation and display units, and so on that together are available on a portable information device such as a cellular phone or a PDA.

It is another object of the present invention to allow a portable information device to be effectively associated with a home network, so that information provided by appliances connected to a home network can be used on a portable information device.

Accordingly, the present invention intends to make the home network accessible from a portable information devices such as a cellular phone and PDAs. Hence, using a personalization-oriented portable information device leads to the personalization of the operation of home appliances connected to the home network, thereby providing a solution to the problem that the manner of use of home appliances is different depending on individuals. To this end, according to one aspect of the present invention, there is provided a portable information device comprising initialization data transmitting means for transmitting initialization data to an access point connected to a home network networking home appliances. The portable information device further comprises response data receiving means for receiving response data responsive to the initialization data from the access point. An operational information transmitting means are provided for transmitting information used to operate a home appliance connected to the home network after the response data receiving means has received the response data.

The operational information transmitting means may transmit identity information, such as URL, for identifying the home appliance to select it from among home appliances connected to the home network, so that the communication with the selected home appliance become available.

Pursuant to another aspect of the present invention, there is provided an access device connected to a home network and serving as an access point to permit an access to the home network from a portable information device. The access device comprises a network interface for accessing a home network of home appliances to communicate with each of the home appliances. A portable information device interface is provided for communicating with the portable information device. Control means including a CPU and a memory device are provided for negotiating with the portable information device via the portable information device interface. Data are transmitted between the portable information device and each of the home appliances through the portable information device interface and the network interface after the negotiation by the control means.

The control means may determine whether data received from the portable information device interface are valid. When the data are valid, the control means determine whether the data are an initialization packet. When the data are an initialization packet, the control means newly creates an initialization packet and outputs the new initialization packet to the portable information device interface. A communication path is thus established after the negotiation to confirm, for example, matching of the protocol between the portable information device and the home appliance.

The control means may be arranged to analyze data derived from the portable information device interface and to deliver the data to the network interface after a protocol conversion. Such an arrangement advantageously permits home appliances connected to the home network to be operated by means of resources of the portable information device.

Preferably, the arrangement is such that the control means determine whether data received from the network interface are valid for accessing the portable information device. When the data are valid, the control means create a transfer packet and output it to the portable information device interface, thus enabling the portable information device to use resources of home appliances connected to the home network.

Pursuant to still another aspect of the present invention, there is provided a home network system comprising a home network for networking a plurality of home appliances. The home network system comprises a portable information device connectable to the home network in a wireless manner. An access point is provided for reciprocal data communication between the home appliances connected to the home network and the portable information device. The portable information device does negotiation to be served by the access point.

The portable information device may be arranged such that it transmits to the access point the data used to select a home appliance from among a plurality of the home appliances after the negotiation. Hence, a plurality of the home appliances connected to the home network are used as servers, so that designating the URL of a desired home appliance in a WWW-accessing manner provides communication with the designated home appliance.

According to a methodological aspect of the present invention, there is provided a method for accessing a home network for networking a plurality of home appliances. The home network access method comprises receiving from a portable wireless information device a request for accessing the home network. The home network access method further comprises recognizing, upon receipt of the request for access, an address for designating a home appliance with which the portable wireless information device will communicate. The home network access method is capable of exchanging data between the home appliance designated by the recognized address and the portable wireless information device.

According to another methodological aspect of the present invention, there is provided a method for accessing a home network networking a plurality of home appliances. The home network access method comprises transmitting a request for accessing the home network to an access point connected to the home network. The home network access method comprises transmitting address information used to designate a home appliance included in the home network after the transmission of the request for access. Transmitting, after the transmission of the address information, operational information used to operate the home appliance is included in the home network access method.

A program implementing each method of the present invention may be installed in the portable information device via the Internet by a program transmission device. In this case, the program transmission device may be a computer that comprises a storage device and a transmission device for transmitting the program read from the storage device thereby. The storage device is provided for storing the program for executing: a step of transmitting a request for accessing the home network to the access point connected to the home network; a step of transmitting an address information to select a certain home appliance networked by the home network after the transmission of the request for access; and a step of transmitting information used to operate the selected home appliance after the transmission of the address information. Installing the program through the Internet, therefore, allows even the portable information device that did not previously have a function for accessing the home network to obtain and store the function.

DESCRIPTION OF THE PREFERRED EMBODIMENT

Figure 1:
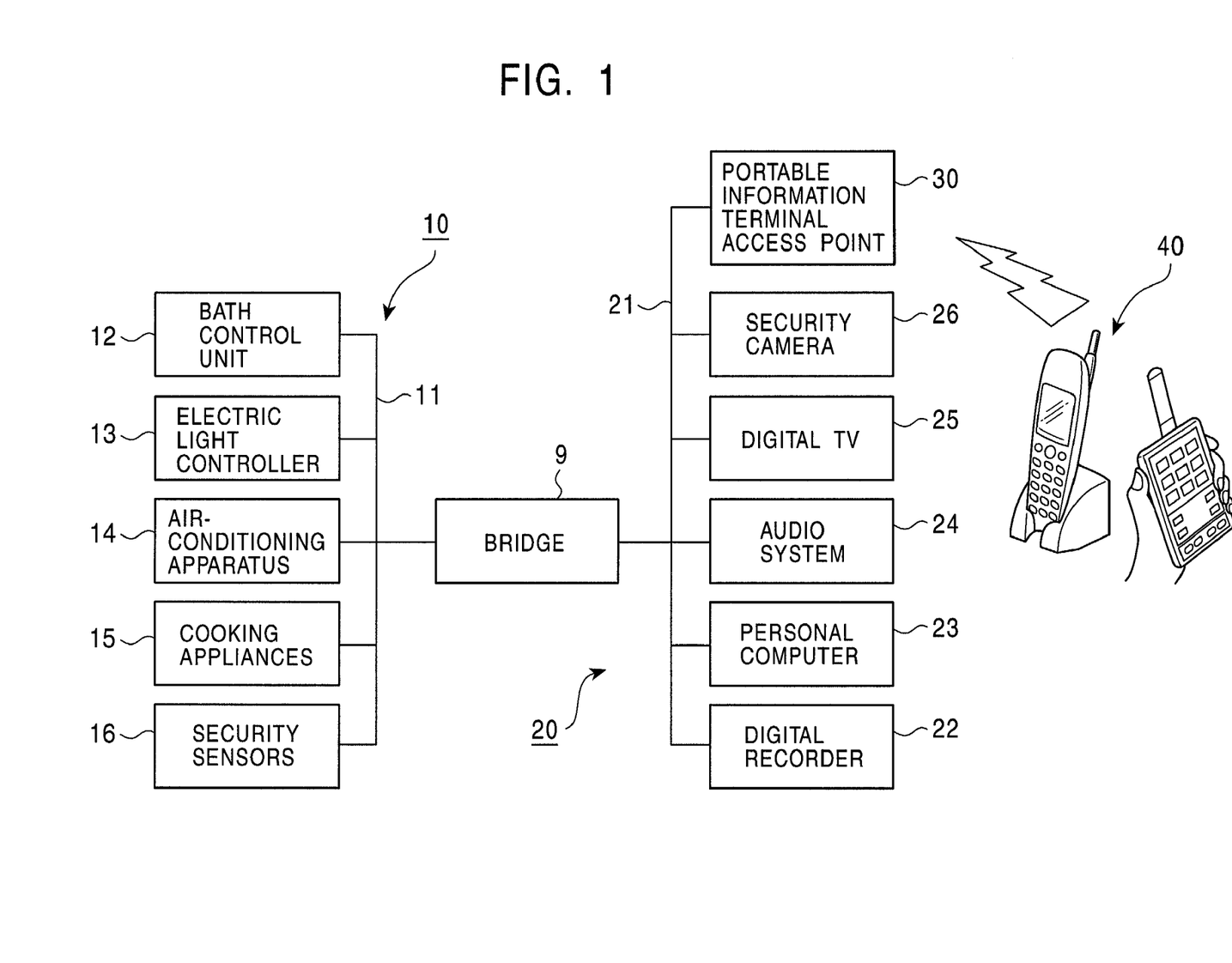
FIG. 1 is a diagrammatical representation of an overall configuration of a home network used in an embodiment of the present invention.

The present invention will be described in detail according to embodiments viewed in drawings. FIG. 1 shows an overall configuration of a home network of an embodiment. The home network system generally includes a low-speed network system 10 in which home electric appliances are connected, a high-speed network system 20 in which home audiovisual devices and the like are connected, and a bridge 9 for interconnecting the low-speed and the high-speed network systems. A gateway may be provided instead of the bridge 9. The bridge 9 or the gateway contributes to converting formats of messages and character codes and exchanging address structures varying from network to network, protocols used at various layers, and so on.

The low-speed network 10 for home electric appliances is networked by the low-speed network 11. The low-speed network 11 connects a bath control unit 12 for controlling temperature of supplied bath water and a water level of a tub, a lighting controller 13 of room lights, air-conditioning equipment 14 such as an air conditioner, cooking appliances 15 including a microwave oven and a refrigerator, and security sensors 16 including sensors for detecting burglary, gas leakage, and frequency in the use of home appliances. These units, controllers, equipment, appliances, and sensors and others are also referred to collectively as home appliances. Some multipurpose systems for the low-speed network 11 that allow various home appliances to be easily controlled are studied. For example, Echonet Consortium and HomePlug™ have been standardizing such systems.

The high-speed network system 20 including home audiovisual devices is networked by a high-speed network 21 based on a technical standard such as Ethernet. The high-speed network connects digital recorders 22 for the use of digital recording, such as a digital film recorder, a digital voice recorder, and a digital video recorder, a personal computer (PC) 23, an audio system 24, a digital TV 25, and a security camera 26 for watching over an entrance or a specific place. These digital devices, PC, audio system, security camera and so on are also referred to collectively as home appliances. The high-speed network 21 also connects a portable information device, such as a cellular phone and a personal digital assistant (PDA), and an access point 30 used as an access device for the portable information device 40. The access point is connected in a wireless or wired manner and exchanges data with the portable information device 40. When a home appliances connected to the high-speed network 21 is controlled, Hypertext Transfer Protocol (HTTP), which is described in Request For Comments 2068 (RFC2068), is used as server protocol, so that the home appliance can take advantage of the technology of World Wide Web (WWW). In this network mentioned above, the bridge 9 is used as HTTP server.

A portable information device 40 as typified by a cellular phone is intended to use for calling and communicating data outside. The portable information device 40 is constantly connected to public infrastructures, thereby charged for the connection. On the other hand, the portable information device 40 of this embodiment can be directly connected to a home network via the access point 30, not a public infrastructure. The communication between the portable information device 40 and home appliances therefore is not charged.

In this communication, an Internet protocol (IP) or other exclusive protocol helps data transmission, such as packet transmission, between the access point 30 and the portable information device 40. Thereby, the portable information devices 40 can communicate with various home appliances including home audiovisual devices connected to the high-speed network 21 and home electric appliances connected to the low-speed network 11. When the portable information device 40 accesses the access point 30, the access point 30 receives information from the home appliances connected to the high-speed network 21 and/or the low-speed network 11 and returns the information to the portable information device 40. The portable information device 40 that received the information selects a home appliance from among the home appliances connected to the home network according to the received information, thus starting to operate the selected home appliance.

Figure 2:
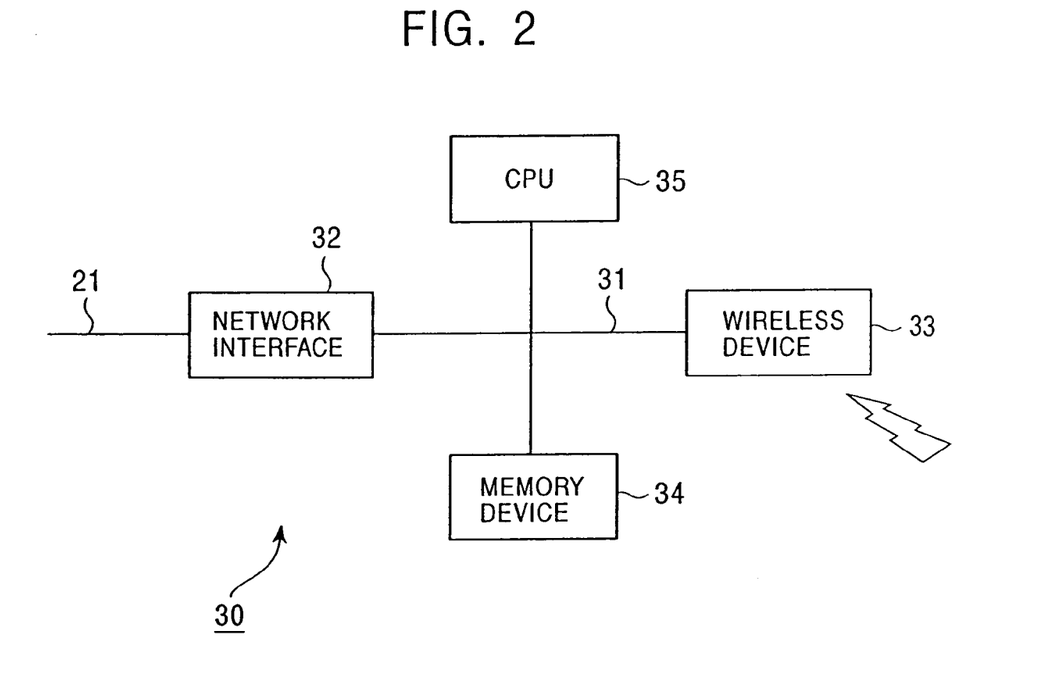
FIG. 2 is a diagram showing an internal configuration of a portable information device access point.

FIG. 2 shows an internal configuration of the portable information device access point 30. The access point 30 comprises through buses 31 a network interface 32, a wireless device 33 used as interface for portable information devices 40, and controlling means including a memory device 34 and a CPU 35. The network interface 32 is connected to the high-speed network 21 and transmits protocol data to and from the home appliances or the like. The wireless device 33 transmits data to and from the portable information device 40 with packets or the like. If the access point 30 is physically connected through wire to, for example, the portable information device 40, the wireless device 33 serves as connection interface. The memory device 34 works for temporarily storing protocols received from the high-speed network 21 and the portable information device 40. The CPU 35 analyzes data received from the network interface 32 and the wireless device 33. When the network interface 32 and the wireless device 33 have different transmission rates or different protocols each other, the CPU 35 routes the data and/or converts the protocols by using the memory device 34. Thus the CPU 35 enables the network interface 32 and the wireless device 33 to bidirectionally transmit data.

For example, when the portable information device 40 such as the cellular phone or the PDA accesses the lighting controller 13 included in the low-speed network system 10 and controls on-off action of lights, the portable information device 40 does negotiation to be served by the access point 30. After the negotiation, communication packets are transmitted via the access point 30 from the portable information device 40 to the high-speed network 21.

When the portable information device 40 accesses the bridge 9, it designates the URL like "Bridge" in a WWW-accessing manner. This designation of the URL permits the portable information device 40 to access the bridge 9. When the high-speed network system 20 accesses the bridge 9 with HTTP, the bridge 9 recognizes or checks home appliances connected to the low-speed network 11 by means of a protocol such as Echonet or HomePlugor and determines what home appliances are currently available. The determination result is transmitted to the portable information device 40 via the access point 30, expressed by Hypertext Markup Language (HTML), HTML2 (RFC1866), HTML4 (ISO8879), or the like.

The bridge 9 having a function for converting protocols of the high-speed network system 20 and the low-speed network system 10 allows the portable information device 40 to realize various applications. The applications includes, for example, controlling on-off and lighting of room lights, setting air-conditioner, supplying bath water, checking statuses of security sensors such as a door lock sensor, break-in sensor, and in-existence sensor, operating security equipment such as door lock, transmitting data to cooking appliances including a microwave oven, operating appliances, and indicating statuses.

Besides the bridge 9, the home appliances connected to the high-speed network 21, such as digital recorder 22, the personal computer 23, the audio system 24, the digital TV 25, and the security camera 26, are operated by the portable information device 40, if these home appliances have the function as HTTP server. Hence, accessing in a www-accessing manner, the portable information device 40 operates each home appliance having URL and indicates the status of each home appliance.

Figure 6:
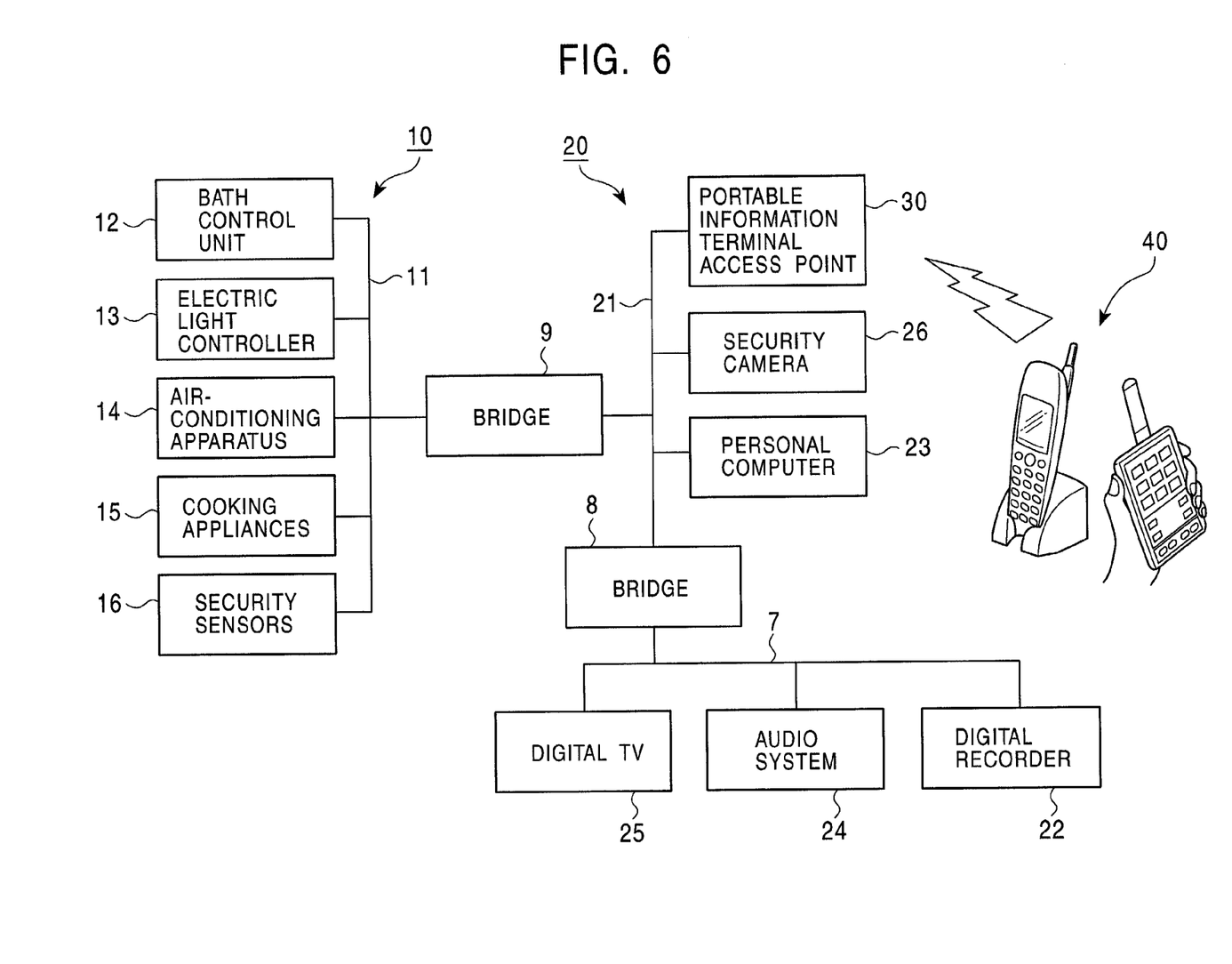
FIG. 6 is a diagram showing another configuration of the home network.

FIG. 6 illustrates another configuration of the home network of the embodiment shown in FIG. 1. The home network of this embodiment comprises IEEE1394 bus 7 connected via a bridge 8 to the high-speed network 21 as typified by Ethernet. The IEEE1394 bus 7 connects home appliances meeting IEEE1394 standard, such as the digital TV 25, the audio system 24, and the digital recorder 22. The IEEE1394 bus is available to some restricted applications including audiovisual devices. IEEE1394, a high-speed digital serial interface standardized internationally, has now three types of transmission rates, 100 Mbps, 200 Mbps, and 400 Mbps, further planed to normalize the rate of 800 Mbps and more. IEEE1394 employs the isochronous transfer mode for transferring preferentially sounds and animation. IEEE1394 contributes to power supply through its bus and allows each home appliance to be directly connected with other devices without any host such as a PC, thus being used as infrastructure for the home network for networking the audiovisual devices of this embodiment. Hence, IEEE1394 allows the portable information device 40 to operate each home appliance connected to the IEEE1394 bus and to indicate the status of the home appliance. The portable information device 40 accesses, in a WWW-accessing manner, home appliances connected to the IEEE1394 bus 7 via the bridge 8 as well as home appliances connected to the low-speed network 11 via the bridge 9.

Figure 3:
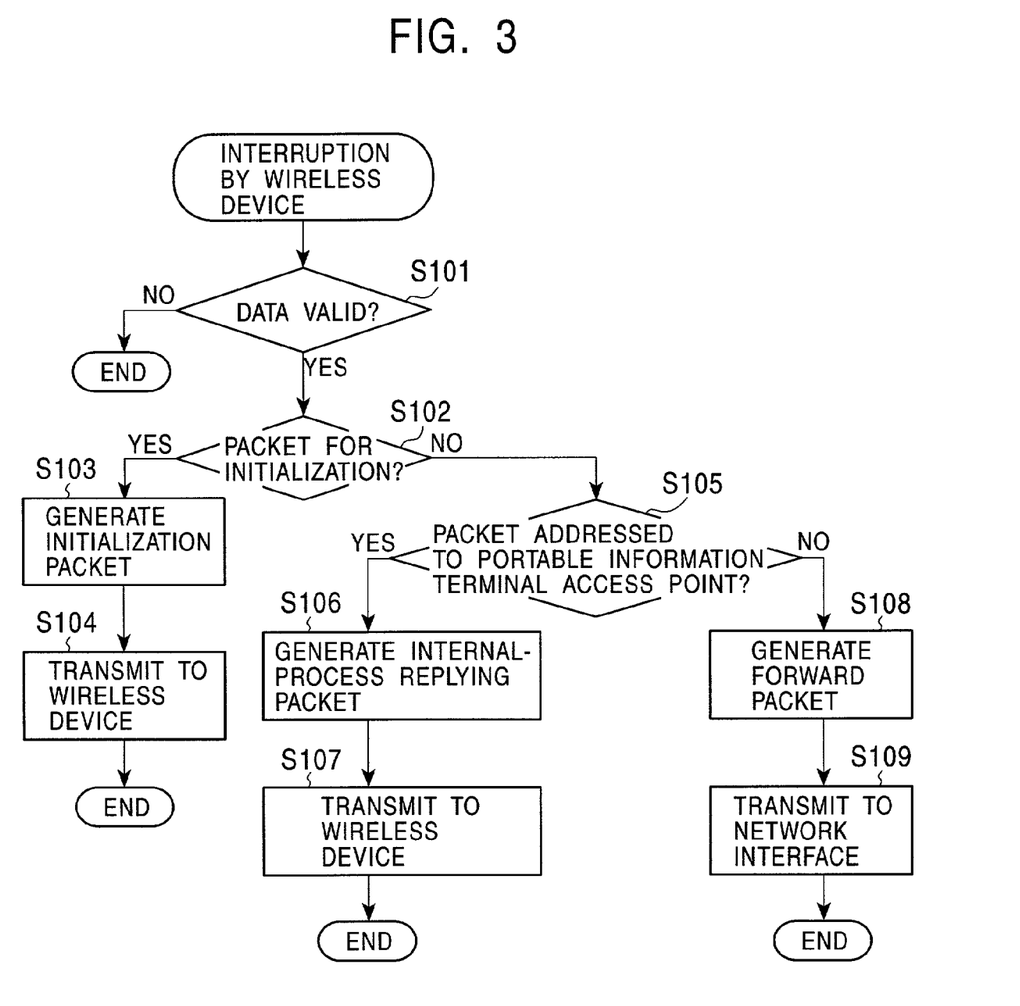
FIG. 3 is a flowchart of the operation of a CPU in the portable information device access point.
Figure 4:
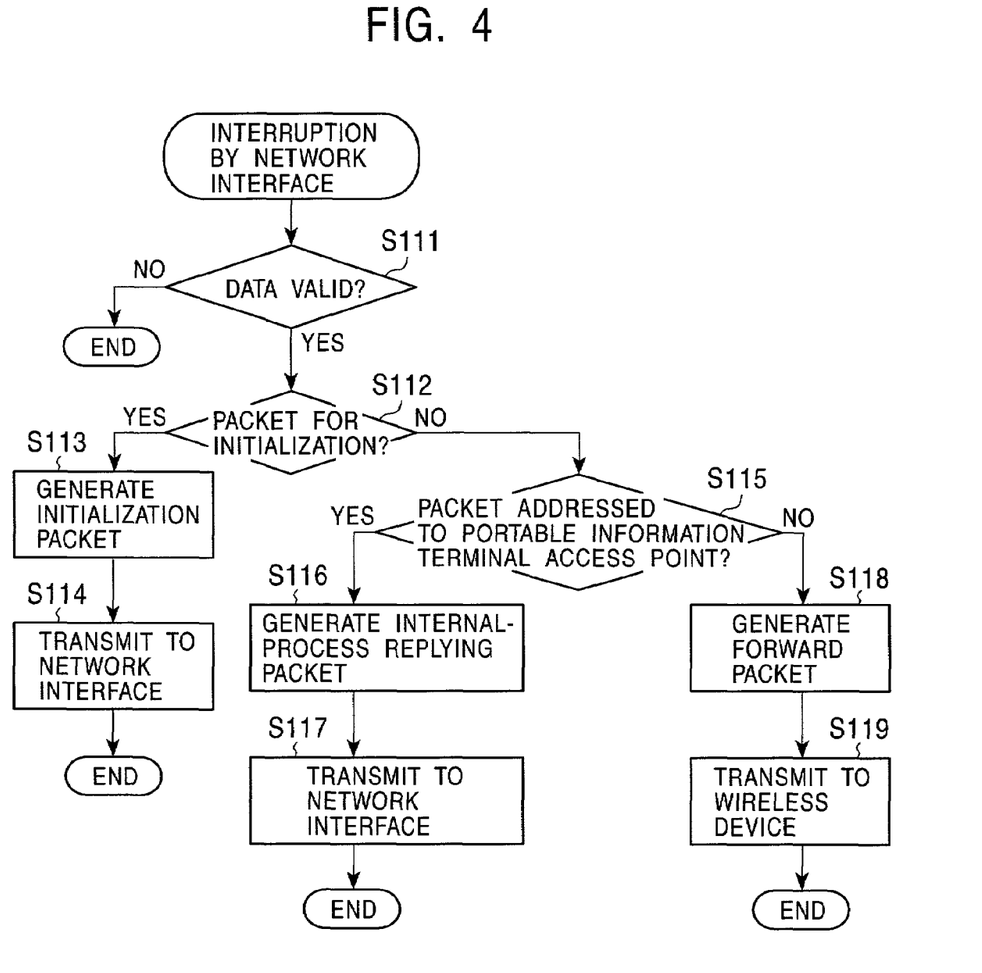
FIG. 4 is a flowchart of the operation of the CPU 35 in the portable information device access point.

FIG. 3 and FIG. 4 show flowcharts of operations of the CPU 35 in the access point 30. FIG. 3 and FIG. 4 respectively illustrate the case of interruption by the wireless device 33 and the case of interruption by the network interface 32. The CPU 35, first, does negotiation to check whether the protocol of the portable information device 40 corresponds with that of the access point 30. For example, when the portable information device 40 communicating by wireless enters an area where it can communicate with the access point 30, the CPU 35 determines what communication will be established between the access point 30 and the portable information device 40 and what protocol is available.

As shown in FIG. 3, when the CPU 35 is interrupted by the wireless device 33, it determines whether the data are valid (step 111). More specifically, the CPU 35 determines whether the packet requesting for interruption is valid and whether the packet does not have errors. If the data are invalid, the process is finished. Otherwise, the CPU 35 determines whether the packet is an initialization packet (step 102). If the packet means an initialization packet, a new initialization packet is created (step 103) and transmitted to the wireless device 33 (step 104), and then the process is finished. If the packet does not mean the initialization packet, the packet is determined whether it is to be transmitted to the access point 30 (step 105). If so, a packet for returning internal processing is created (step 106) and transmitted to the wireless device 33 (step 107), and then the process is finished. Otherwise, a transmission packet is created (step 108) and transmitted to the network interface 32 (step 109), thus transmitted to home appliances included in the home network system.

When the CPU 35 is interrupted by the network interface 32, as shown in FIG. 4, it determines whether the packet itself is available, or whether the data of the packet are valid (step 111). If the data are invalid, the process is finished. Otherwise, the CPU 35 determines whether the packet means an initialization packet (step 112). If the packet is the initialization packet, a new initialization packet is created (step 113) and transmitted to the network interface 32 (step 114), and then the process is finished. If the packet does not mean the initialization packet, the packet is determined whether it is to be transmitted to the access point 30 (step 115). If so, a packet for returning internal processing is created (step 116) and transmitted to the network interface 32 (step 117), so that the packet for returning to home appliances included in the home network system is transmitted. If the packet is not to be transmitted to the access point 30, a transmission packet is created (step 118) and transmitted to the wireless device 33 (step 119), so that data are transmitted to the portable information device 40 from home appliances included in the home network system. In this embodiment, the CPU 35 determines whether data are valid in the case of the interruption by the network interface 32 as well as in the case of the interruption by the wireless device 33. Thus, the access point 30 appropriately deals with such problems noise breaks out in a packet or that a plurality of home appliances request for data transmission at the same time.

Figure 5:
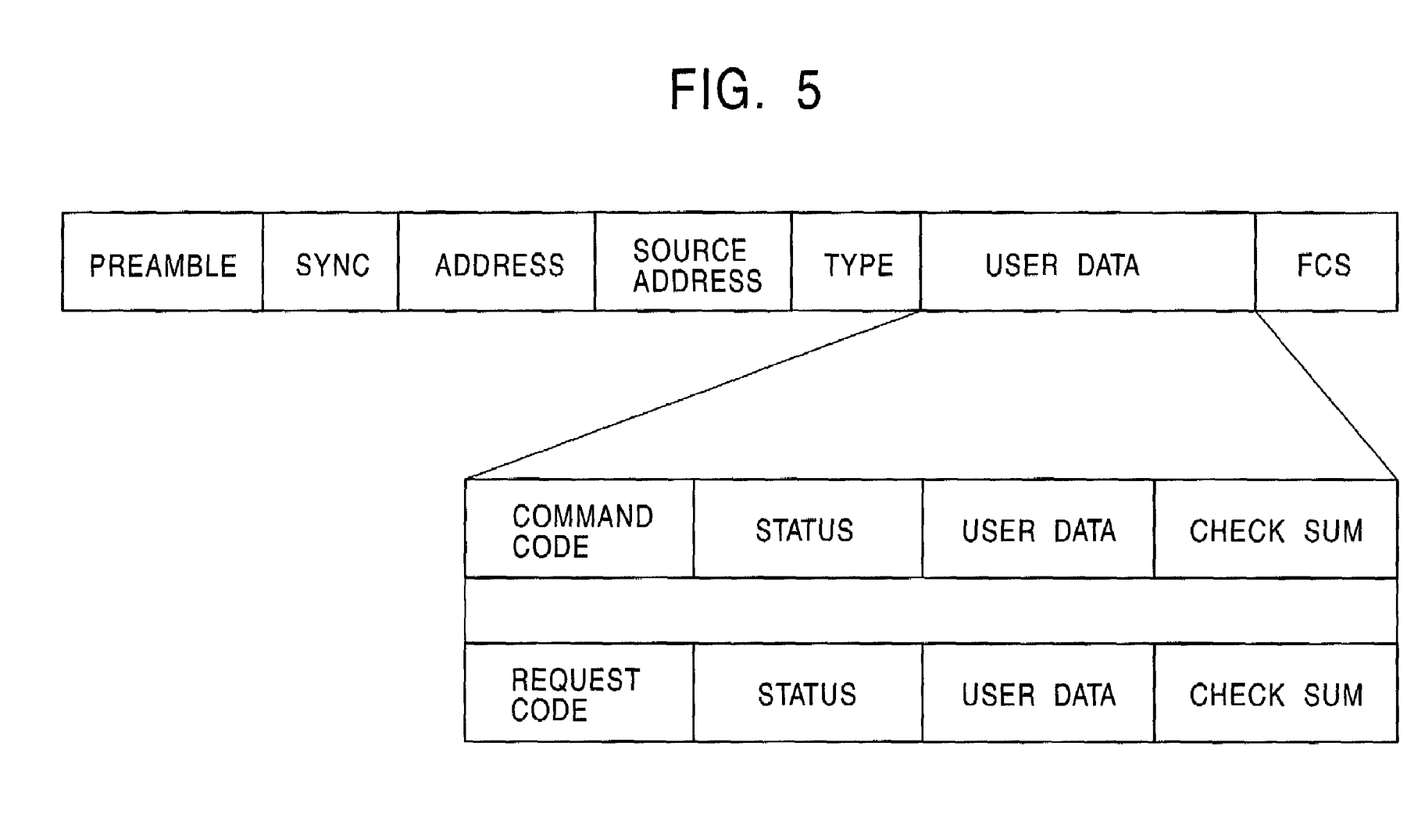
FIG. 5 shows an example of packets flowing on the home network according to an embodiment of the present invention.

FIG. 5 shows an example of a series of packets flowing on the home network of this embodiment. In the series of packets, a SYNC signal for synchronizing is transferred following a preamble, and then destination and source addresses to and from which packets are transmitted. Then, user data and a frame check sequence (FCS) are transmitted in order. The user data include command codes specifying data types, data status, user data being actual data, a check sum for dealing with errors in the user data, and request codes for specifying requirements between the portable information device 40 and the home network system.

This embodiment allows the portable information device as typified by a cellular phone to access the high-speed network system 20 with and/or without wire, not served any public circuit. Therefore the resources and operation and display units that together are provided in the portable information device 40 are available in the house. Directly connecting the portable information device 40 to the high-speed network system 20 in the house contributes to the home network without using public infrastructure.

When resources included in the home network system are mutually used between the home network and portable information device, only the desired home appliance and network are selected through recognizing or certifying each of the home network and portable information device and the network. Unnecessary home appliances and network are rejected as well.

Another embodiment of this invention may be configured such that the portable information device 40 on standby or sleep automatically ups and runs to execute necessary processes according to a request for connection and then returns to standby or sleep. This configuration allows the home appliances connected to the home network to use and operate the resources of the portable information device 40 without regard to the state of the portable information device 40.

What is claimed is:

1. A portable information device comprising:
    initialization data transmitting means for transmitting initialization data to an access point connected to a high-speed network of a home networking system including a bridge configured to change the protocol between a high-speed network for connecting electronic devices and a low-speed network for connecting home appliances, wherein a plurality of the electronic devices and the home appliances are configured to function as hyper text transfer protocol (HTTP) servers, and are accessible from the portable information device by a uniform resource locator (URL);
    response data receiving means for receiving response data responsive to said initialization data from said access point connected to the high-speed network of a home networking system; and
    operational information transmitting means for transmitting information used to operate a home appliance connected to the low-speed network or electronic device connected to the high-speed network after said response data receiving means receives said response data.

2. An access device connected to a high-speed network of a home network and serving as an access point to permit access to said home network from a portable information device, said access device comprising:
    a network interface for providing access to a home network including a bridge configured to change the protocol between a low-speed network for connecting home appliances and a high-speed network for connecting electronic devices, said network interface operating to communicate with each of said home appliances and electronic devices, wherein a plurality of the electronic devices and the home appliances are configured to function as hyper text transfer protocol (HTTP) servers, and are accessible from the portable information device by a uniform resource locator (URL);
    a portable information device interface for communicating with said portable information device; and
    control means for negotiating with said portable information device via said portable information device interface, said control means configured to provide conversion of transmission rates and protocols to enable said portable information device to communicate with said home network, wherein data can be transmitted between said portable information device and each of said low-speed network for connecting home appliances and high-speed network for connecting electronic devices through said portable information device interface and said network interface after the negotiation by the control means.

3. A home network system comprising:

a bridging element configured to provide conversion of formats of messages and character codes, and to exchange address structures;

a home network including a bridge configured to change the protocol between a low-speed network for connecting home appliances and a high-speed network for connecting electronic devices;

a portable information device connectable to said home network in a wireless manner; and an access point connected to the high-speed network for reciprocal data communication between said low-speed network for connecting home appliances and said high-speed network for connecting electronic devices and said portable information device, said, wherein said home network includes a bridge configured to change the protocol of data sent between said low-speed network and said high-speed network, wherein said portable information device performs negotiation with said access point to gain access to said home network; and wherein a plurality of the electronic devices and the home appliances are configured to function as hyper text transfer protocol (HTTP) servers, and are accessible from the portable information device by a uniform resource locator (URL).

4. A method for accessing a home network, comprising:

receiving from a portable wireless information device a request for accessing information used to designate home appliances and electronic devices included in said home network including a bridge configured to change the protocol between a low-speed network for connecting home appliances and a high-speed network for connecting electronic devices which provides conversion of formats of messages and character codes, and enables exchange of address structures, wherein a plurality of the electronic devices and the home appliances are configured to function as hyper text transfer protocol (HTTP) servers, and are accessible from the portable wireless information device by a uniform resource locator (URL);

recognizing, upon receipt of the request for access, a URL address for designating home appliances or electronic devices with which said portable wireless information device will communicate; and enabling exchange of data between the low-speed network connecting home appliances or high-speed network connecting electronic devices designated by said address and said portable wireless information device by providing conversion of transmission rates and protocols to enable communication between said home appliances and electronic devices connected to said home network and said portable information device.

5. A method for accessing a home network, comprising:

transmitting a request for accessing information used to designate home appliances or electronic devices included in said home network to an access point connected to a high-speed network of said home network including a bridge configured to change the protocol between a low-speed network connecting home appliances and a high-speed network connecting electronic devices;

providing conversion of transmission rates and protocols to enable communication between said home appliances and electronic devices connected to said home network and a portable information device, wherein a plurality of the electronic devices and the home appliances are configured to function as hyper text transfer protocol (HTTP) servers, and accessible from the portable information device by a uniform resource locator (URL);

transmitting URL address information used to designate home appliances or electronic devices included in said home network; and transmitting operational information used to operate said home appliances or electronic devices.

* * * * *